United States Patent [19]

Matsumoto et al.

[11] 3,805,242

[45] Apr. 16, 1974

[54] MULTIPLEX DATA TRANSMISSION SYSTEM FOR PROCESS CONTROLLER

[75] Inventors: Kuniaki Matsumoto; Shinichi Yamada, both of Hitachi, Japan

[73] Assignee: Hitachi Ltd., Chiyoda-ku, Tokyo, Japan

[22] Filed: Dec. 10, 1971

[21] Appl. No.: 206,799

[30] Foreign Application Priority Data

Dec. 11, 1970 Japan .............................. 45-109499

[52] U.S. Cl......... 340/163 R, 340/151 R, 340/147 F

[51] Int. Cl. ............................................ H04q 11/00

[58] Field of Search...................... 340/163 R, 147 F

[56] References Cited

UNITED STATES PATENTS

| | | | |
|---|---|---|---|
| 2,629,088 | 2/1953 | Kendall | 340/163 R |
| 2,735,083 | 2/1956 | Finlay | 340/163 R |
| 2,794,179 | 5/1957 | Sibley | 340/163 R |
| 2,942,238 | 6/1960 | Eckhardt | 340/163 R |
| 2,944,247 | 7/1960 | Breese | 340/163 R |
| 3,034,099 | 5/1962 | Brixner | 340/163 R |
| 3,122,723 | 2/1964 | Coley | 340/163 R |

*Primary Examiner*—Harold I. Pitts

[57] ABSTRACT

A multiplex data transmission system is provided between a process controlling computer and a plurality of sensor signal transmitting end stations and control signal receiving end stations in pairs throughout the process. Different address frequencies are assigned to each of the end stations, so that the computer may call one of the sensor signal transmitting end stations by sending its address frequency as a signal over a common address line, in response to which the sensor signal transmitting end station will transmit signals, either analogue or digital, back to the computer together with its self-generated identification assigned address frequency, with the sensor signal corresponding to a characteristic of the process. The computer will process the received sensor signal and send a control signal, either analogue or digital, to the associated control signal receiving end station of the pair over a common line by simultaneously sending its assigned address frequency. All of the end stations will be addressed sequentially in order during normal operation, but if one of the sensors produces a signal beyond a normal range to denote an emergency, the emergency sensor signal will be transmitted along with its assigned address frequency to the computer as soon as the system is instantaneously free of address frequencies so that the emergency sensor signal may be squeezed in out of order. The system may operate as either a sensor signal data bus system or highway system, with the data being sent by either space division or time division, respectively.

14 Claims, 13 Drawing Figures

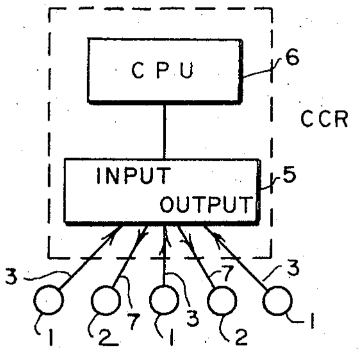

FIG. 1

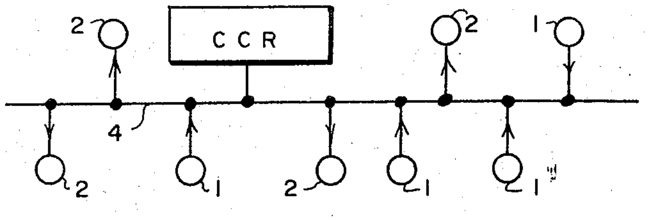

FIG. 2

DATA BUS SYSTEMS

| SYSTEMS | 1 | 2 | 3 | 4 |
|---|---|---|---|---|
| ADDRESS | SPACE DIVISION | FREQUENCY DIVISION | SPACE DIVISION | FREQUENCY DIVISION |
| DATA | SPACE DIVISION | SPACE DIVISION | FREQUENCY DIVISION | FREQUENCY DIVISION |
| TRANSMISSION LINE | TOTAL NUMBER OF BITS | 1 OR 2 NUMBER OF DATA BITS | ADDRESS BITS 1 OR 2 | 2 OR 4 |

FIG. 3

DATA HIGHWAY SYSTEMS

| SYSTEMS | 5 | 6 | 7 | 8 |
|---|---|---|---|---|
| ADDRESS | TIME DIVISION | TIME DIVISION | FREQUENCY DIVISION | FREQUENCY DIVISION |
| DATA | TIME DIVISION | FREQUENCY DIVISION | TIME DIVISION | FREQUENCY DIVISION |
| TRANSMISSION | 2 OR 4 | 2 OR 4 | 2 OR 4 | 2 OR 4 |

FIG. 4

MULTIPLEX DATA TRANSMISSION SYSTEM FOR PROCESS CONTROLLER

BACKGROUND OF THE INVENTION

Processes have been controlled by computers, and it is particularly desirable to locate the computers at a central location with respect to a process that is widely distributed and varies considerably with respect to its characteristics that are to be controlled. Communication lines leading directly between the computer and the points of sensing and control of the process in a radial manner require considerable expenditures with respect to initial set-up cost, and further require considerable space. Multiplex data transmission systems have been developed as an improvement, wherein different signals are sent over a common line.

The process to be controlled may vary considerably in form, but by way of example may be a chemical process wherein pressure, temperature and humidity characteristics must be measured at a plurality of points located throughout the process to monitor the process characteristics,and valves, heating means and humidifiers must in turn be controlled at the respective points to compensate for deviations from predetermined standards. Of course, most any type of process may be controlled by a computer with respect to widely varying characteristics other than specifically mentioned above.

SUMMARY OF THE INVENTION

The present invention relates to the multiplex transmission of data between a centrally or conveniently located computer and at least one process to be controlled having a plurality of sensor signal transmitting end stations and control signal receiving end stations. The transmission system employs address signals calling for sensor data to be transmitted to the computer, identifying sensor data being transmitted to the computer, and identifying control data being transmitted to the control end stations. The data signals may be either digital or analogue and would include the signals sent from the sensors and the control signals sent to the various controllers. The multiplex transmission system will transmit the address signals on a frequency division basis, and will transmit the data signals on a space division or time division basis according to whether a data bus system or a data highway system is employed, respectively.

The sensor end stations will be called to supply their data alternately with the sending of control signal data to the control end stations, in a prescribed order. Means are provided at the various sensor end stations to determine a sensor signal outside of a normal range to denote an emergency situation and send the emergency sensor signal to the computer as soon as the system is without an address frequency, to squeeze the sensor signal into the computer out of order to compensate for the change as soon as possible.

BRIEF DESCRIPTION OF THE DRAWING

Further objects, features and advantages of the present invention will become more clear from the following detailed description of the drawing, wherein:

FIG. 1 is a block diagram outlining a conventional process control computer system;

FIG. 2 is a block diagram showing a multiplex transmission control system;

FIG. 3 is a table listing the various types of data bus systems for a multiplex transmission control system according to FIG. 2;

FIG. 4 is a table listing the various types of data highway systems for a multiplex transmission control system according to FIG. 2;

Figure 5:
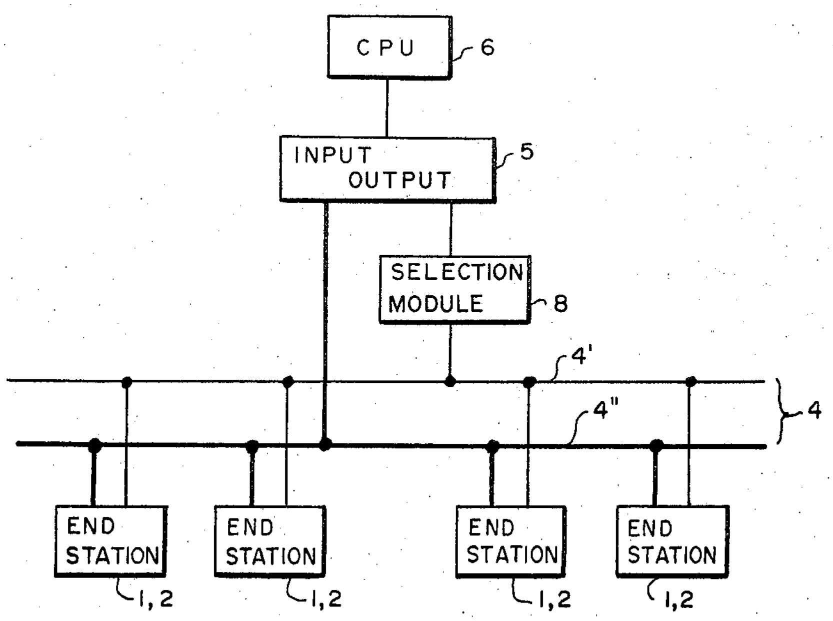
FIG. 5 is a block diagram showing a multiplex transmission data bus system according to the present invention.
Figure 10:
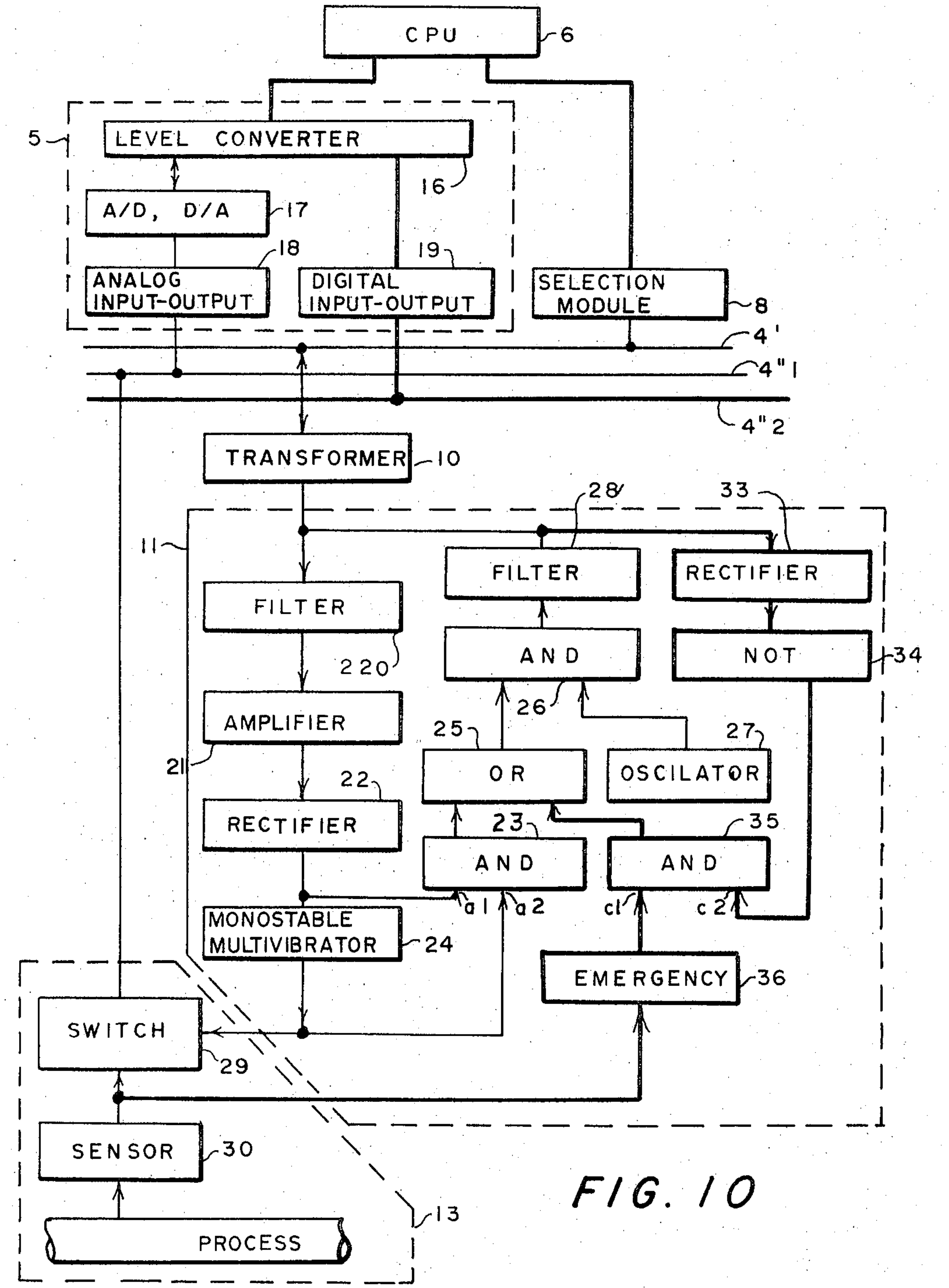
FIG. 10 is a block diagram, in greater detail, of a portion of the system according to FIG. 9 with respect to the transmission of analogue data between the computer and a sensor signal transmitting end station.
Figure 13:
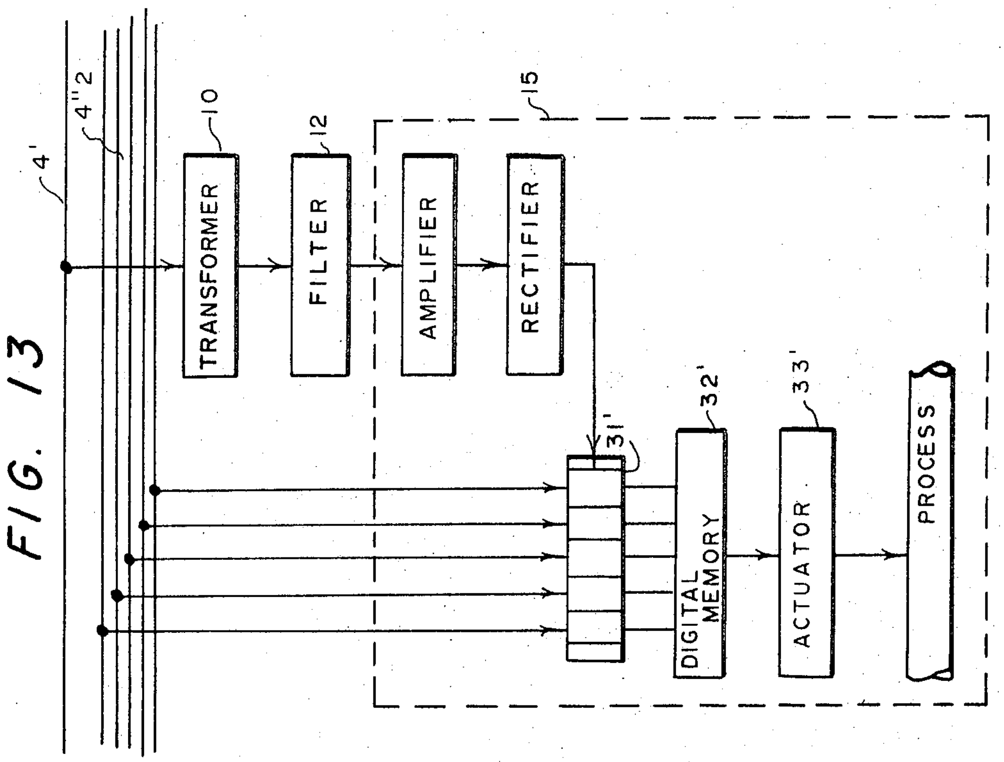
FIG. 13 is a block diagram of a portion of the system according to FIG. 9, and similar to FIG. 11, but showing the transmission of digital data to a control signal receiving end station.
Figure 11:
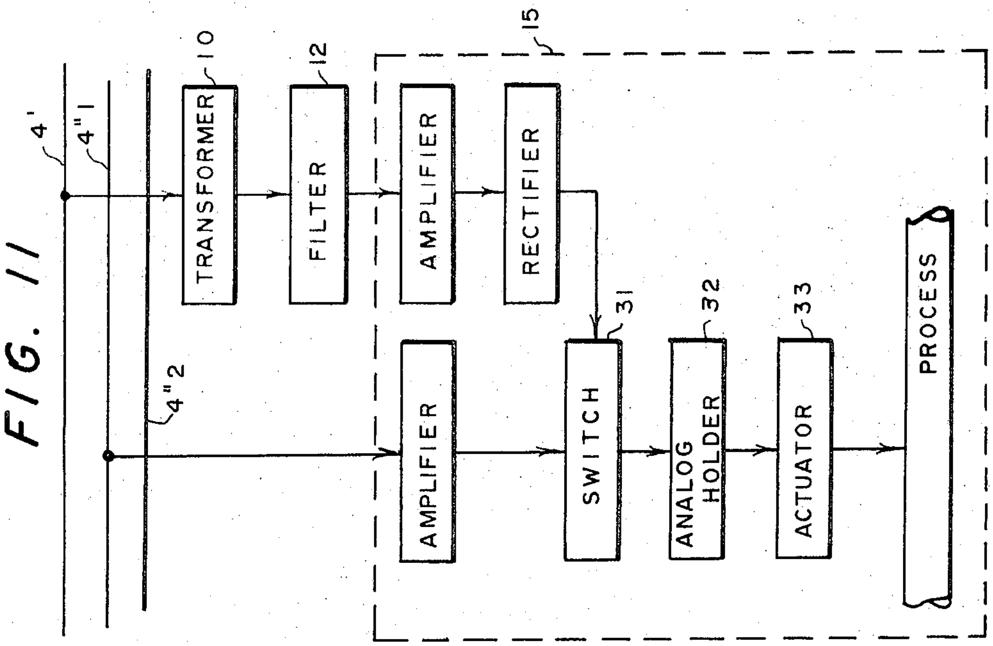
FIG. 11 is a portion of the system according to FIG. 9, in greater detail, as applied to the transmission of analogue data to a control signal receiving end station.
Figure 12:
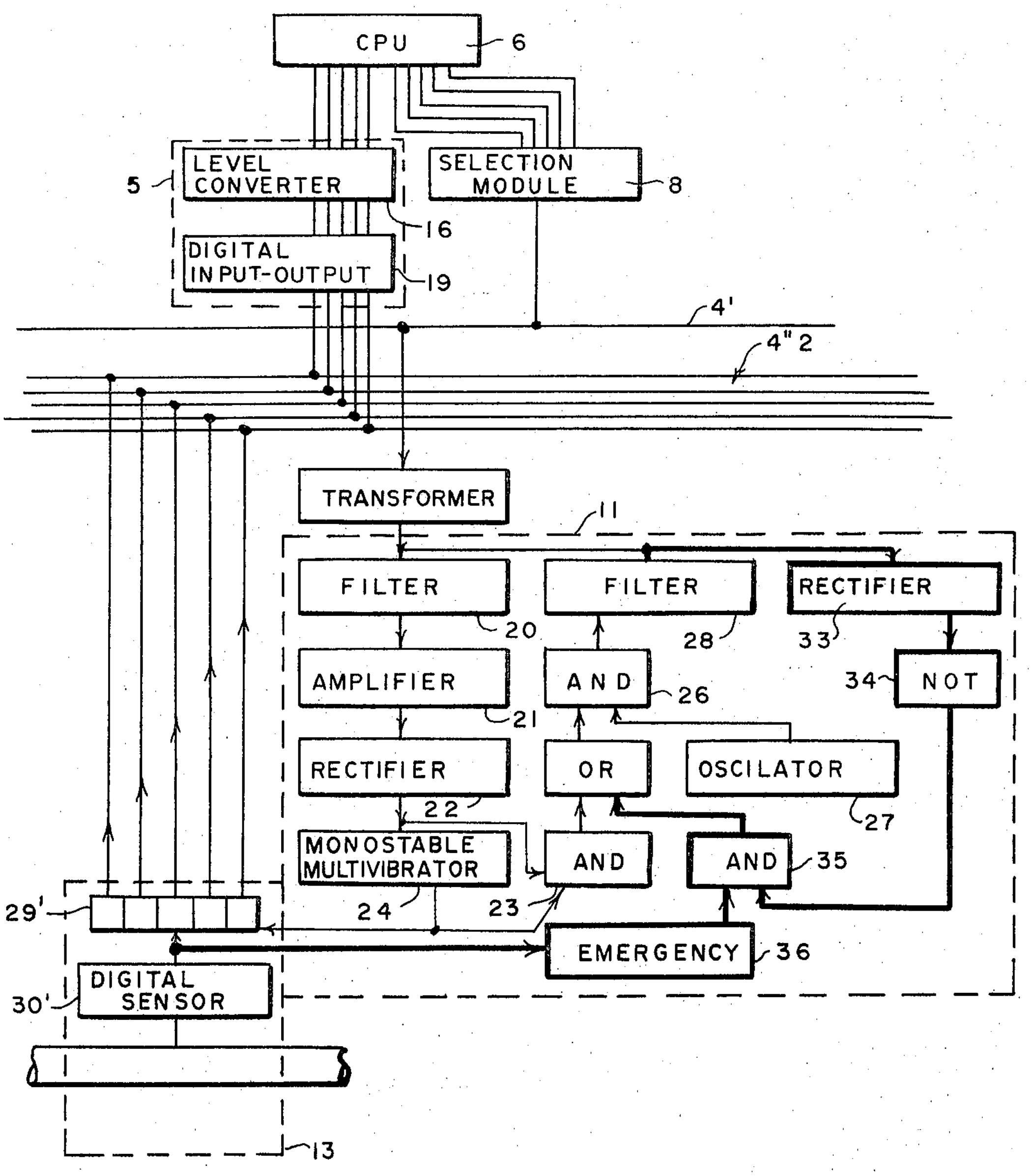
FIG. 12 is a block diagram of a portion of the system according to FIG. 9,and similar to FIG. 10, but showing the transmission of digital data between a sensor signal transmitting end station and the computer.

Further, FIGS. 10 and 11 may be considered as showing details of FIG. 5 for an analogue system, or FIGS. 12 and 13 may be considered as showing details of FIG. 5 for a digital system.

DETAILED DESCRIPTION OF THE DRAWING

The present invention relates specifically to a process control system for transmitting address and data signals in multiplex transmission, with address being transmitted on a frequency division basis and the data being transmitted on a space division or time division basis.

In the field of process control, concentrated or central control systems have only recently been increasingly adopted in which process sensor signals from a number of signal or sensor sources (hereinafter referred to as sensor signal transmitting end stations) distributed over a broad area are concentrated by being transmitted to a central control room (hereinafter referred to as CCR) for processing in a central processor unit (hereinafter referred to as CPU) or computer and the resultant control signals from the computer are transmitted to the respective processes, particularly to control signal receiving end stations. The transmission systems largely fall into two kinds or categories, namely, conventional electrical computer systems as typically shown in FIG. 1 and multiplex transmission systems as typically shown in FIG. 2, which have been recently developed and are being progressively put into practice.

Throughout the present specification, like numerals will be used for like parts in the various figures and embodiments, with it being understood that correspondingly identified elements or parts will be identical in structure and function, except where otherwise indicated so that descriptions of these elements may not be repeated unnecessarily.

In the conventional electrical computer type central control system as shown in FIG. 1, signal from individual signal sources 1 having process sensors are sent by conventional two-wire lines 3 to be collected in an input-output control unit 5 in the CCR for processing in a central processing unit CPU 6. The CPU will produce control signals from these processed input signals, which control signals will be sent by the input-output control unit 5 through the individually provided exclusive transmission lines 7 to the desired one of the respective processes or control signal receiving end stations 2. With this system, it is possible to utilize transmission of standardized signals and adopt standard designs for the individual control units, because separate transmission lines are provided for communication between the various end stations and the CCR. However, the individual signal sources are coupled to the CCR in a radial fashion, which necessarily results in a very high cost of initial cable laying, space requirement, maintenance and difficulty of expanding the system.

In the multiplex transmission system as shown in FIG. 2, the individual signal sources 1 and control processes 2 are coupled to the CCR through a single transmission line 4 and the signals are transmitted in multiplex transmission.

In multiplex transmission, the initial laying of the transmission line is at a greatly reduced cost when compared with the system of FIG. 1 and requires considerably less maintenance. Precision, response speed, versatility and complexity of the multiplex process control system have been increased accompanying the improvements of the computer performance. Under these circumstances, there have been developed multiplex transmission systems such as data bus systems and data highway systems, which permit constructing a large scale complex computer system, and coupling signal sources and processes distributed over a broad area to the computer.

The data bus systems and data highway systems can be classified according to whether the signal is transmitted on a time division basis, space division basis or frequency division basis, and so forth. The signal transmission on the time division basis involves conversion of parallel data into series data; that is, time division multiplexing is the process of transmitting two or more signal over a common path by using different time intervals for different signals. In the transmission of data on the space division basis, the data is transmitted bit by bit. In the transmission on the frequency division basis, the data is converted into signals at different frequencies for transmission to and from the respective end stations. Frequency division multiplexing involves the process or device in which each signal channel modulates a separate sub-carrier, the sub-carriers being spaced in frequency to avoid overlapping of the sub-carrier side bands, and the selection and demodulation of each signal channel on the basis of its frequency, so that two or more signals may be sent over a common path by using a different frequency band for each signal.

Four data bus systems are shown using the various combinations of space division and frequency division. In FIG. 4, there is shown four additional data highway systems, 5–8, which involve combinations of time division and frequency division. In each of these eight systems, the data transmitted may include analogue or digital quantities, or a combination of both. Further, one bus of the transmission line may also serve as the ground line. An address line and a data line may be provided separately, or a single line may be used commonly.

With respect to the above eight systems, the present invention is specifically related to system 2 of FIG. 3 and system 7 of FIG. 4. In other words, the present invention aims to provide a multiplex transmission system adopting frequency division for the address transmission and either space division or time division for the data transmission. FIG. 5 illustrates the multiplex data bus system 2 of FIG. 3, while FIG. 6 illustrates the multiplex data highway system 7 of FIG. 4.

In the multiplex data bus system of FIG. 5 employing address frequency division and data space division, the address line 4' is common to all of the end stations 1, 2 and the data transmission line 4'' is common to all of the end terminal stations 1, 2. When the computer 6 through the input-output control unit 5 calls for a particular end station, the selection module or call unit 8 will transmit an address signal at a particular fixed frequency assigned to the desired end station 1, 2. Each of the end stations 1, 2 will have a different address signal assigned to it. The above description is equally applicable to the multiplex data highway system of FIG. 6 employing frequency division address and time division data.

Figure 6:
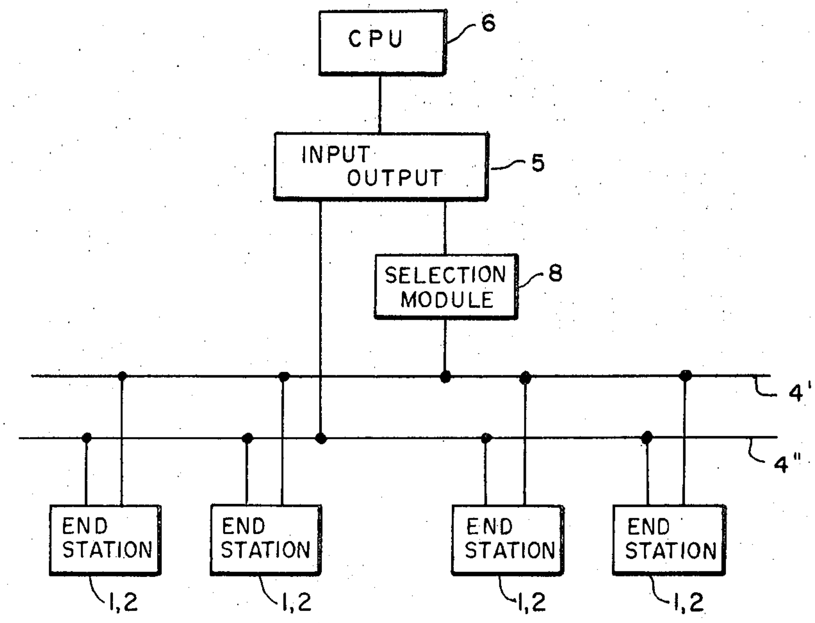
FIG. 6 is a block diagram showing a multiplex transmission data highway system according to the present invention.

However, the difference between the multiplex data bus system of FIG. 5 and the multiplex data highway system of FIG. 6 resides in the data transmission line 4'', with the address transmission line of the two systems being identical. In the system of FIG. 5, a plurality of data transmission lines are provided for the individual bits of data, while in the system of FIG. 6, the data transmission line consists of two lines. In other words, the present invention provides two systems, namely the multiplex data bus system wherein the address is transmitted on a frequency division basis and the data is transmitted on a space division basis, and the multiplex data highway system wherein the address is transmitted on a frequency division basis and the data is transmitted on a time division basis.

Figure 7:
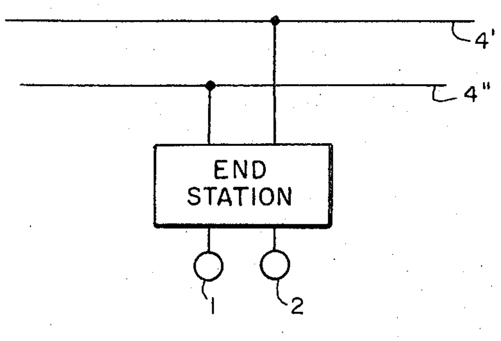
FIGS. 7 and 8 are block diagrams showing an end station for either of the systems according to FIGS. 5 and 6.

In each of the systems according to FIGS. 5 and 6, the end station 1, 2 is, in more detail, as shown in FIG. 7. The end station 1, 2 is connected to the address line 4' and the data transmission line 4''. The end station 1, 2, although preferably a single packaged unit may be thought of as a signal transmitting end station receiving a signal from source 1 and a control signal receiving end station for providing a control signal from the computer to the process controller 2. Although many different type of sensors and controllers may be used, by way of example, a pressure sensor in a process fluid line may provide an electric signal correlated to the fluid pressure and constitute the signal source 1, and an adjustable throttle valve correlating a control signal to an orifice opening may constitute the controller at 2.

Figure 8:
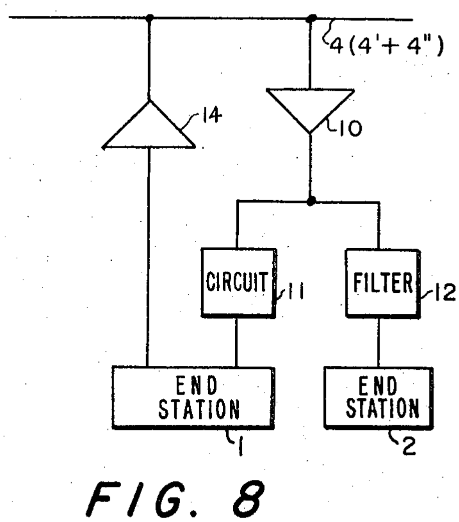

A particular type of connection is schematically shown in FIG. 8 for the end station of FIG. 7. The address frequency signal transmitted through the address line 4' to each end station is amplified by the amplifier 10 and coupled to both a next stage self-control circuit 11 and a filter 12. When the particular address frequency of the sensor signal transmitting station 1 of FIG. 8 is sent out over the address line 4'from the CCR, the self-contained or controlled circuit 11 will permit sensor signal data from 1 to pass through the amplifier 14 to the transmission line 4 for transmission to the CCR; if the address frequency sent out over the address line 4' is not that of the end station 1 of FIG. 8, the circuit 11 will not permit the sensor signal data from 1 to pass to the transmission line 4. Similarly, when the specific address frequency assigned to the end station 2 of FIG. 8 is sent out from the CCR over the transmission line 4, particularly the address line 4', it is passed through amplifier 10 and filter 12 to the control signal receiving end station 2 for control of the process by the control signal carried therewith; similarly, if the address signal in the transmission line 4 is not of the same frequency as will be passed by the filter 12, no control data will be passed to the end station 2 of FIG. 8.

Usually, the control signal data to be sent to one of the end stations 2 and the sensor signal data sent from one of the end stations 1 will have a numerical value of 0 to 9 or an analog quantity of 0 to 50 mV irrespective of the number of measurement spots or end stations. The address, however, may be changed in an indefinite number of steps corresponding to the number of end stations. Thus, it is possible to change the number of end stations in practice from the number originally planned and set up during installation to any number of desired from thereafter. Accordingly, the system may be enlarged from year to year as desired by the addition of new stations.

Accordinng to the present invention, the alteration of the system may be readily achieved from freely changing the address frequencies. The system then can be versatile in that it can be compatible with a changeable number of end stations, so that it can be gradually enlarged in scale step-by-step as needed.

Since each end station has a self-control or self-contained function, redundancy can be provided in the transmission line and the processing capacity of the computer.

Further, since the address transmission is based on the frequency division, noise is less significant in the system.

Each end station may be quite simple in comparison to prior art devices, which is economical.

Moreover, it is possible to readily observe or monitor at any desired place other than the CCR by merely providing a suitable detector at the desired location.

The signal frequencies for the address to identify each end station may be readily preset.

Furthermore, the transmission system according to the present invention may be employed in the transmission of analog quantities as well as in the transmission of digital quantities, as will be described hereinafter, so that conventional instruments, process units and other apparatus may be directly employed. Because the analog and digital components are well known per se, they will be described in detail and are represented in the drawing by block diagrams to concentrate on the inventive features.

BUS SYSTEM

Figure 9:
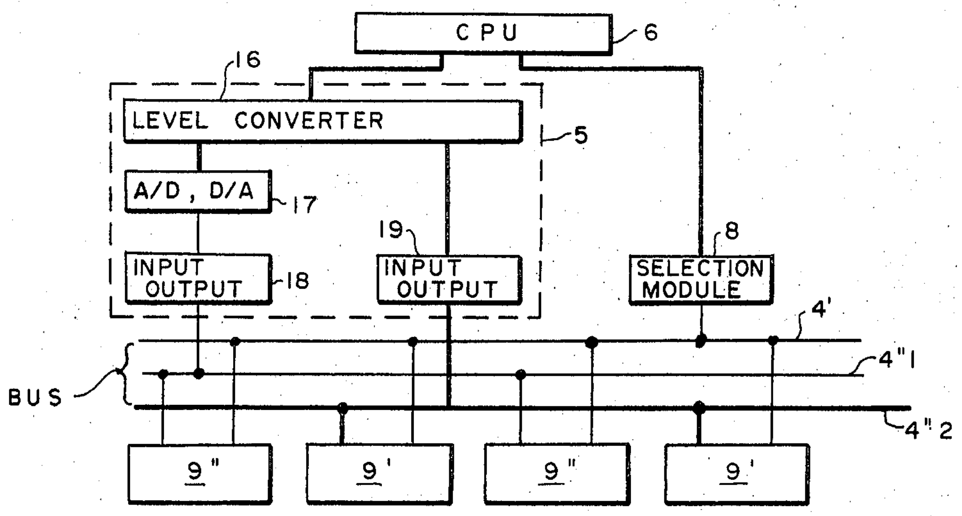
FIG. 9 is a block diagram of a data bus system with provision for the transmission of both analogue and digital data for a single process and common computer.

In the multiplex data bus system of FIG. 9, the end stations 9' have digital transmitters and receivers, while the end stations 9'' have analog transmitters and receivers, which as shown may be used in the same system. The input-output control circuit is shown enclosed within a dashed rectangle 5, the function of which will be described in greater detail hereinafter in connection with FIG. 10. Briefly, it includes a level converter 16, an analog-to/from-digital converter 17, analog input-output unit 18 and a digital input-output unit 19. For this system, there is a separate analog transmission line 4''1 and a separate digital transmission line 4''2, which together form the previously described transmission line 4''. The remaining components have been described previously.

ANALOG SENSOR BUS TRANSMISSION

In FIG. 10, there is shown an analog sensor signal transmitter end station as a portion of the transmission system according to FIG. 9, bu in greater detail.

To call a given end station, the central processing unit 6 delivers a call instruction to the selection module 8, which thereupon sends forth an address at frequency $f_0$ assigned to the particular end station desired, which address goes over the address line 4' for a time period $T_0$ .

On the end station side, the frequency $f_0$ is coupled through a transformer 10 to a filter 20. If the frequency $f_0$ is the assigned frequency for the end station shown in FIG. 10, it is passed through the filter 20 and amplified by an amplifier 21. The amplified a-c output is then rectified by an amlifier 22 into a d-c signal, which is coupled to both AND circuit 23 as one input and to the monostable multivibrator 24. The gates $a_1$ and $a_2$ of the AND circuit 23 are held open respectively for periods $T_1$ as determined by the input address frequency and $T_2$ as determined by the monostable multivibrator 24. The output of the AND circuit 23 is passed through one input of an OR gate 25 to a next-stage AND circuit 26, whose other input is connected to an oscillator 27 that always provides an output, that is, is always in the "on" state, with the oscillator having an output frequency identical to that assigned to its station. Thus, the AND gate 23 permits the oscillator output at frequency $f_0$ for the period equal to the time $T_1$ of the pulse output of the AND gate 23. The output signal thus permitted by the AND gate 26 is coupled through a transmission filter 28 and transformer 10 into the address line. This signal is also coupled from the transmission filter 28 through the filter 20, amplifier 21 and rectifier 22 to the AND gate 23 input $a_1$ ; thus, both the gates $a_1$ and $a_2$ of the AND circuit 23 are simultaneously open for the period $T_2$ , which may be longer than the period $T_1$ so that the system is self-contained once actuated.

Meanwhile, th output of the monostable multivibrator opens the gate of the electronic switch 29 for th period $T_2$ to permit the signal from the sensor 30 to pass through the electronic switch 29 to the data bus 4''.

In the above manner, both the address and data are simultaneously sent out over the respective buses for the period $T_2$ in response to the call from the computer so that the data being sent is identified as to its source. If the data is an analog signal, it is transmitted by the analog bus, while if it is a digital signal, it is transmitted by the digital bus.

The address signal transmitted from the end station over the address line is received by the selection module 8, where it is converted into a predetermined digital signal to be coupled to the central processor unit 6. The sensor data signal sent over the data bus 4''1 enters the level converter 16 through the analog input-output unit 18 when as previously described it is an analog signal, or directly to the level converter by way of the digital input-output unit 19 when it is a digital signal travelling over the digital data transmission line 4''2.

The level converter 16 converts the level of the digital signal in the unit 5 into coincidence with the level of the digital signal within the computer.

In the above manner, both the address and the data from the particular end station simultaneously enter the central processor unit 6, where the origin of the data is identified and the data is subjected to processing accordingly.

ANALOG CONTROL BUS RECEIVER

With respect to a control signal receiving end station as shown in FIG. 11, which is a detail of a portion of the system according to FIG. 9, the above described process with respect to FIG. 10 is generally reversed in sequence, in that the control signal is transmitted from the computer to the end station or process. The address signal and the control signal for the designated end station is simultaneously provided from the computer. The call signal from the computer is converted by the module 8 into a corresponding address frequency and sent out over the address line 4'. The control digital signal from the computer is coupled through the level converter 16 to the digital to analog converters 17, so that the now analog control signal will pass through the analog input-output unit 18 to the analog data transmission line 4''1. In the case of a digital signal, the digital signal would pass directly from the computer through the level converter 16 and the digital input-output unit 19 to the digital data transmission line 4''2.

The control signals that are passed over the data transmission lines as above described are selectively received or detected at the desired end station according to the assigned address frequency simultaneously sent out.

Assuming that the end station of FIG. 11 has been chosen by the computer to achieve the control analog signal, the frequency address from line 4' passes through the transformer 10, filter, amplifier and rectifier to pass as a d-c signal to actuate the electronic switch 31. With actuation of the switch 31, the analog control signal in line 4''1 passes from the amplifier through the actuated switch 31 to the analog holder 32, where it will be used as an output to drive the actuator 33 for controlling the process in the desired manner.

EMERGENCY BUS TRANSMITTER

With reference back to FIG. 10, the elements shown in bold or heavy lines are sent into operation when it is desired to forcibly squeeze a signal from the sensor signal transmitting end station to the computer in the event that there is a sudden abnormal change taking place at that point in the process and the particular end station would not otherwise be called by the computer according to its regular programmed sequence of calling a plurality of end stations.

If this particular end station was being called by the computer there would be no problem.

It is now assumed that some other end station is in communication with the computer over the data transmission line. Accordingly, an address frequency signal assigned to another end station would therefore be present in the address transmission line. In this case, the prevailing address frequency signal is coupled through the transformer 10 and rectified at 33 into a d-c signal. This d-c signal, however, is inhibited by a NOT circuit 34 to close the corresponding gate of the AND circuit 35, as indicated. Thus, in the case when an address frequency signal assigned to another end station is present, the gate $c_2$ of the AND circuit 35 is closed, so that the prevailing signal in the address line is preferred in the case of actuation of the emergency circuit 36. The emergency circuit 36 would monitor the continuous output of the sensor 30 and be actuated if the sensor output varies from a predetermined set normal range to indicate an emergency situation.

As soon as the address frequency of the prevailing foreign end station is removed from the address transmission line, the NOT circuit 34 will provide an output to open the gate $c_2$ of the AND circuit 35. At this time, the gate $c_1$ of the AND circuit 35 has already been opened by the output signal of the emergency circuit 36, so that the AND circuit 35 provides a pulse output, which is coupled through the OR gate 25 to the appropriate gate of the AND circuit 26. Thus, the AND circuit 26 provides the address signal from the oscillator 27 to the transmission filter 28 where it is coupled by the transformer 10 to the data transmission line. Simultaneously, the address frequency signal from the oscillator 27 is passed directly from the transmission filter 28 to the filter 20, through the amplifier 21 and rectifier 22 to the monostable multivibrator 24 to render it operative for its given period $T_2$, during which, as described previously, the gate of the electronic switch 29 will be held open to transmit the signal from the sensor 30. Further, as before the output of the monostable multivibrator will be passed through the AND circuit 23 and OR circuit 25 to feed the address frequency of the oscillator 27 simultaneously with the feeding of the data back to the computer in a self-sustained manner as determined by the period of operation of the monostable multi-vibrator 24, as previously described.

In the above manner, when there is a sudden change in the process beyond that which would be considered normal by the emergency unit 36, a measurement of sensor signal from the sensor 30 can be forcibly sent out from its end station directly to the computer out of sequence so that the computer may process it and accordingly send out a control signal to the same end station to correct the situation. It is understood that the computer will call many stations in sequence, but the above emergency procedure will allow communication with the computer on an emergency basis out of sequence.

DIGITAL SENSOR BUS TRANSMITTER

In FIG. 12, there is shown a digital sensor signal transmitter end station as a part of the overall multiplex data bus system of FIG. 9, the operation of which will be clear to one having ordinary skill in the art when it is realized that it is identical to the previously described operation of the system of FIG. 10, with the only changes being that a digital sensor is employed to provide a digital sensor signal output for the digital data transmission line 4''2, which is in direct communication through the digital input-output unit 19 and level converter 16 to the CPU 6, as indicated. Further, it is necessary to employ a digital switch 29' for the unit of FIG. 12 and other equivalent digital components instead of analog components where necessary.

DIGITAL CONTROL BUS RECEIVER

Similarly, the digital control signal receiving end station of FIG. 13 is a detail of the overall multiplex bus system of FIG. 9, and corresponds exactly in structure and function to the previously described end station of FIG. 11, except that where necessary digital components have been substituted for analog components. That is, the system of FIG. 13 has a digital memory 32′ and a digital input electric switch 31′ for its digital actuator 33 coupled thereby to the digital data transmission line 4″2, which elements take the place of the corresponding analog elements of FIG. 11, with the remaining elements being identical in structure and function to those of FIG. 11 with similar numerals.

HIGHWAY SYSTEM

While the preceding has provided a detailed description of a bus system with respect to both digital and analog end stations functioning as both sensor signal transmitting stations and control signal receiving stations with emergency capabilities, the present invention is equally applicable to a corresponding highway system, which would be constructed identically except for the changes necessary to provide a highway data transmission instead of a bus data transmission. Such may be readily achieved by adopting a well known construction for the P-S converter for the data transmission insofar as each end station address frequency signal from the module 8 will be sent out as a series signal.

While various forms of the present invention have been described in detail as preferred, it is understood that additional embodiments, modifications and variations are contemplated within the spirit and scope of the present invention as defined by the following claims.

What is claimed is:

1. A multiplex data transmission system for providing communication between a central process control computer and a plurality of end stations, with some of the end stations being at locations of a process wherein it is desired to sense a process characteristic with a sensor that produces a signal and other of the end stations being at positions wherein the process is directly controlled by a controller actuated by a control signal for changing the same process characteristics, comprising:

a plurality of sensor signal transmitting end stations for transmitting the sensor signal to the computer;

a plurality of control signal receiving end stations;

call means associated with a central computer for selectively providing a plurality of separate different address frequencies individually assigned to each of said end stations, respectively;

an address line for transmitting address frequencies between said computer and all of said end stations; and a data line for transmitting the sensor signal from said sensor signal transmitting end stations to the computer and for transmitting said control signal from said computer to said control signal receiving end stations;

each of said sensor signal transmitting end stations having:

first frequency discriminating means responsive only to the address frequency assigned to its end station through said address line, means for transmitting the sensor signal to the computer through said data line only when actuated, and means for actuating said sensor signal transmitting means in response to the output of said first frequency discriminating means, so that when a selected address frequency is sent out by the computer call means only the sensor signal transmitting end station assigned the selected address frequency sent out will transmit the sensor signal back to the computer;

each of said control signal receiving end stations having:

means for passing a control signal from the computer to the controller only upon being actuated, and a second frequency discriminating means responsive only to the address frequency assigned to its end station for actuating said means for passing, so that when the computer sends out a control signal and said call means simultaneously sends out an address signal assigned to the end station for which the control signal is intended, only the controller of the intended end station will receive the control signal.

2. The multiplex data transmission system of claim 1, wherein each of said sensor signal transmitting end stations has address means responsive to said first frequency discriminating means actuating said means for transmitting, to transmit its assigned address frequency to the computer through said address line simultaneously with the transmission of the sensor signal to the computer through said data line.

3. The multiplex data transmission system of claim 2, wherein said actuating means actuates, in response to the output of said first frequency discriminating means, both said sensor signal transmitting means and said address transmission means simultaneously over a predetermined fixed time period at least substantially longer than the period of time during which said call means sends out its address frequency.

4. The multiplex data transmission system of claim 1, wherein some of said sensor signal transmitting end stations have:

emergency means for causing an emergency signal when a sensor signal coming from the sensor is beyond a predetermined normal range, and means for receiving all of the address frequency transmitted between said call means and said end station through said address line; when no address frequency is on said address line, said address means transmits its assigned address frequency in response to both said emergency signal from said emergency means and the output of said all address frequencies receiving means.

5. The multiplex data transmission system of claim 4, wherein some of said sensor signal transmitting end stations have an oscillator in said address means for oscillating its assigned address frequency, the output terminal of said oscillator being connected to said address line through a third filter and a first gate of said address means;

said first frequency discriminating means is a first filter of which an output terminal is operatively connected to said actuating means through a rectifier means; and sensor signal transmitting has a sensor converting the associated process characteristics into the sensor signal and a switching means for passing said sensor signal to said data line in response to the output of said actuating means.

6. The multiplex data transmitting system of claim 5, wherein said control signal receiving end station has a data holding means which memorizes the control signal from said control signal passing means.

7. The multiplex data transmitting system of claim 6, wherein said some of the sensor signal transmitting end stations have:

a second gate which causes an output in response to both said emergency signal from said emergency means and the output of said all address frequencies receiving means, and a third gate which causes an output in response to both the outputs of said actuating means and said rectifier means being connected operatively to said first filter, so that said first gate passes the output of said oscillator in response to at least one of the outputs of said second and third gates.

8. The multiplex data transmission system of claim 1, wherein each of said sensor signal transmitting end stations includes a sensor converting the associated process characteristic into only analog data and each of said control signal receiving end stations includes a controller responsive to analog control signals.

9. The multiplex data transmission system of claim 1, wherein each of said sensor signal transmitting end stations includes a sensor converting the associated process characteristics into only digital data and each of said control signal receiving end stations includes a controller responsive to digital control signals.

10. The multiplex data transmission system of claim 1, wherein said computer call means will address the sensor signal transmitting end stations to send sensor data from them in a predetermined sequence to the computer alternately with the addressing of the control signal receiving end stations in a predetermined sequence such that each control signal receiving station will be addressed immediately after its associated sensor signal transmitting end station during normal operation of the system; at least some of said sensor signal transmitting end stations having emergency means responsive to a sensor signal coming directly from the sensor that is beyond a predetermined normal range to produce an emergency signal; means for transmitting the emergency signal to the computer together with the corresponding address frequency for identification only when actuated; means receiving all of the address frequencies from the call means for actuating said emergency transmitting means only when no address frequency is being received, so that an emergency condition at a sensor signal transmitting end station may be transmitted to the computer out of order whenever another address frequency is not being transmitted in the system.

11. The multiplex data transmission system of claim 10, wherein said first frequency discriminating means actuates both said means for transmitting and said address transmission means simultaneously over a predetermined fixed time period at least substantially longer than the period of time the call means sends out its address.

12. The multiplex data transmission system of claim 11, wherein some of said end stations are analog in function and some of said end stations are digital in function; and a single computer having converter means for processing and controlling both analog and digital function end stations.

13. The multiplex data transmission system of claim 1, wherein some of said end stations are analog in function and some of said end stations are digital in function; and a single computer having converter means for processing and controlling both analog and digital function end stations.

14. The multiplex data transmission system of claim 1, wherein said sensor signal transmitting end station transmits its sensor signal on one end of a space division and time division basis, and said control signal receiving end station function on one of a space division and time division basis.

* * * * *